United States Patent
Beaton

(10) Patent No.: US 11,590,586 B2
(45) Date of Patent: Feb. 28, 2023

(54) METHOD AND APPARATUS FOR FORMING A HOLE

(71) Applicant: L. Curtis Beaton, Waltham, MA (US)

(72) Inventor: L. Curtis Beaton, Waltham, MA (US)

( * ) Notice: Subject to any disclaimer, the term of this patent is extended or adjusted under 35 U.S.C. 154(b) by 0 days.

(21) Appl. No.: 17/320,953

(22) Filed: May 14, 2021

(65) Prior Publication Data
US 2022/0362864 A1    Nov. 17, 2022

(51) Int. Cl.
*B23B 51/04*    (2006.01)
*B23B 35/00*    (2006.01)

(52) U.S. Cl.
CPC .......... *B23B 51/0426* (2013.01); *B23B 35/00* (2013.01)

(58) Field of Classification Search
CPC ............... B23B 51/0426; B23B 35/00; B23B 51/00035; B23B 51/044; B23B 51/0467; B23B 51/0468; B23B 51/0095; B27G 15/00; Y10T 408/902
See application file for complete search history.

(56) References Cited

U.S. PATENT DOCUMENTS

| | | | | |
|---|---|---|---|---|
| 1,165,854 A | * | 12/1915 | Davis | B27G 15/00 408/195 |
| 4,798,503 A | * | 1/1989 | Huju | B23B 49/04 144/30 |
| 6,007,279 A | * | 12/1999 | Malone, Jr. | B23B 51/0426 408/206 |
| 2017/0120347 A1 | * | 5/2017 | Lourenco | B27G 15/00 |

* cited by examiner

*Primary Examiner* — Eric A. Gates
*Assistant Examiner* — Paul M Janeski
(74) *Attorney, Agent, or Firm* — Pandiscio & Pandiscio

(57) ABSTRACT

An apparatus for drilling out a plug of material, the apparatus comprising: a base plate having a top surface, a bottom surface, and a central longitudinal axis; a circumferentially-extending side wall extending distally from the top surface of the base plate, the circumferentially-extending side wall terminating in a circular distal end surface; a drill bit centered on the central longitudinal axis of the base plate and extending distally therefrom, the drill bit comprising a distal portion, a proximal portion and an intermediate portion extending between the distal portion and the proximal portion; wherein the intermediate portion of the drill bit comprises a first laterally-extending flat comprising a cutting edge disposed a first distance away from the central longitudinal axis towards the circumferentially-extending side wall and a second laterally-extending flat extending a second distance away from the central longitudinal axis towards the circumferentially-extending side wall, and further wherein the first distance is greater than the second distance.

20 Claims, 13 Drawing Sheets

METHOD AND APPARATUS FOR FORMING A HOLE

FIELD OF THE INVENTION

This invention relates to drilling apparatus in general, and more particularly to novel methods and drilling apparatus for forming a hole in a material, and for removing the drilled-out material from the hole that is drilled out, and from the drilling apparatus.

BACKGROUND OF THE INVENTION

During construction (e.g., of buildings and other structures), it is common to drill holes in building materials in order to accommodate various systems, e.g., plumbing, electrical conduits, HVAC components, etc. By way of example but not limitation, where such systems are disposed behind the finished drywall of a residential or commercial structure, it is common to drill relatively large diameter holes in the studs behind the drywall (e.g., to permit passing piping or conduit through the studs), to drill relatively large diameter holes in plywood (e.g., to permit passing piping or conduit through an exterior wall and hence, through the exterior plywood sheathing), to drill relatively large diameter holes in ceilings (e.g., to accommodate automatic fire sprinklers, lighting, etc.), and in various other contexts.

Where the holes to be drilled are of relatively small diameter (e.g., ⅛"), it is common to use a traditional "cork-screw" style drill bit. In use, such a "cork-screw" style drill bit operates by cutting into a material (e.g., wood) using a quickly rotating pointed end, and then passing debris from the hole drilled into the material by the pointed end along a cork-screw-type recess disposed along the side of the drill bit such that the debris drilled out of the material exits the drill hole. When the drill bit is removed from the drill hole, a hole having the same diameter as the drill bit is left in the material, through which something may thereafter be passed (e.g., a wire, a fastener, etc.).

However, where it is desirable to drill large diameter holes (e.g., a 2.5" diameter hole), such as may be necessary, for example, to accommodate plumbing conduit, etc., it is common to use a "barrel-style" drill apparatus such as the HOLE DOZER™ barrel-style drill apparatus manufactured by Milwaukee Electric Tool Corporation of Brookfield, Wis.

With such a prior art "barrel-style" drill apparatus, a hole is drilled in a material by centering the drill apparatus on the centerpoint of a circle inscribing the hole that is to be drilled, and then rotating the outer wall of the "barrel-style" drill apparatus (e.g., using a power drill) so as to cut a circumferentially-extending (i.e., circular) slot in the material along the perimeter of the circle inscribing the hole that is to be drilled. Once the rotating outer wall of such a "barrel-style" drill apparatus has been advanced sufficiently far through the material in which the hole is being made (e.g., so as to extend through the material to the opposite side of the material), the drill apparatus is withdrawn, leaving a hole in the material having the same diameter as the diameter of the outer wall of the "barrel-style" drill apparatus, and leaving a "plug" of the material which has been drilled out disposed inside the recess defined by the outer wall of the "barrel-style" drill bit.

More particularly, and looking now at FIGS. 1 and 2, there is shown an exemplary prior art "barrel-style" drill apparatus 5 which generally comprises a base plate 10, a circumferentially-extending side wall 15 extending upwardly from base plate 10 so as to define a recess 20, and a centering drill bit 25 centered on base plate 10 (FIG. 2) and extending upwardly therefrom such that drill bit 20 extends slightly beyond the cutting edge of circumferential side wall 15 (e.g., in order to assist in drilling a "starter hole" with drill bit 20 so as to assist in centering the drilling apparatus on the material which is to be drilled). Side wall 15 terminates in a circumferentially-extending cutting edge 30 which comprises a plurality of spaced teeth 35 disposed along cutting edge 30 (i.e., teeth configured for cutting the circumferentially-extending slot in the material which is to be drilled out).

In use, centering drill bit 25 of "barrel-style" drill apparatus 5 is aligned with a centerpoint of a circle inscribing the hole which is to be drilled out on the surface of a material. Centering drill bit 25 is then rotated (e.g., using a power drill) so as to form a "starter hole" in the center of the material which is to be drilled out. Typically, centering drill bit 25 is fixed to, or formed integral with, base plate 10, such that rotation of centering drill bit 25 causes simultaneous rotation of side wall 15. However, since centering drill bit 25 typically extends slightly beyond circumferentially-extending cutting edge 30, centering drill bit 25 typically contacts the material to be drilled before teeth 35 of cutting edge 30. Centering drill bit 25 (and side wall 15) is then rotated further, advancing centering drill bit 25 further into the material until teeth 35 of cutting edge 30 of side wall 15 contact the material and begin forming a circumferentially-extending slot in the material which is to be drilled out. As "barrel-style" drill apparatus 5 is advanced further into the material, the circumferentially-extending slot extends further into the material. Once the "barrel-style" drill apparatus 5 has been advanced through the material which is being drilled (i.e., to the opposite side of the material) such that the circumferentially-extending slot extends all the way through the material which is being drilled out, "barrel-style" drill apparatus 5 is withdrawn from the hole that has been drilled, leaving a "plug" P of material (see FIG. 3) disposed in recess 20 of "barrel-style" drill apparatus 5 (and leaving a drilled out hole having the same diameter as the diameter of the circle inscribed by side wall 15 in the material).

While the "barrel-style" drill apparatus 5 discussed above is effective for drilling a hole having a desired diameter in a material, it has been found that it is often difficult to remove the plug P of material which remains in recess 20 of "barrel-style" drill apparatus 5 after the material has been drilled out. This problem is particularly acute where the material being drilled expands during drilling and binds inside recess 20. By way of example but not limitation, pressure-treated wood (which is chemically-treated and therefore comprises some moisture) will expand due to the heat that results from friction during drilling, with the result that the plug P that remains inside recess 20 after drilling is completed is often difficult (and time-intensive and/or labor-intensive) to remove from recess 20 of "barrel-style" drill apparatus 5. Prior art "barrel-style" drill apparatus typically address this problem by providing a plurality of windows 40 (FIG. 1) formed in side wall 15 so as to permit an end user to insert a lever (e.g., a screwdriver) through a given window 40 (and hence, through side wall 15), which can then be used to pry the plug P lose from recess 20. However, even where such windows 40 are provided, it is still often labor-intensive and/or time-consuming to remove plug P from recess 20. This can be a particularly acute problem where plug P binds to side wall 15 due to expansion of the drilled material (see above), and/or where a large number of such holes are to be drilled.

Thus there is a need for a new and improved apparatus and method for drilling large-diameter holes in a material which facilitates quick and easy removal of the plug of material remaining in the drilling apparatus after the hole has been drilled out of the material.

SUMMARY OF THE INVENTION

The present invention provides a new and improved apparatus and method for drilling large-diameter holes in material which facilitates quick and easy removal of the plug of material remaining in the drilling apparatus after the hole has been drilled out of the material.

In one preferred form of the invention, there is provided an apparatus for drilling out a plug of material, said apparatus comprising:

a base plate having a top surface, a bottom surface, and a central longitudinal axis;

a circumferentially-extending side wall extending distally from said top surface of said base plate, said circumferentially-extending side wall terminating in a circular distal end surface;

a drill bit centered on said central longitudinal axis of said base plate and extending distally therefrom, said drill bit comprising a distal portion, a proximal portion and an intermediate portion extending between said distal portion and said proximal portion;

wherein said intermediate portion of said drill bit comprises a first laterally-extending flat comprising a cutting edge disposed a first distance away from said central longitudinal axis towards said circumferentially-extending side wall and a second laterally-extending flat extending a second distance away from said central longitudinal axis towards said circumferentially-extending side wall, and further wherein said first distance is greater than said second distance.

In another preferred form of the invention, there is provided an apparatus for drilling out a plug of material, said apparatus comprising:

a base plate having a top surface, a bottom surface, and a central longitudinal axis;

a circumferentially-extending side wall extending distally from said top surface of said base plate, said circumferentially-extending side wall comprising an inner surface defining a circular recess enclosed by said circumferentially-extending side wall, an outer surface and a circular distal end surface;

a cutting wedge mounted to said inner surface of said circumferentially-extending side wall and extending laterally inwardly in the direction of said longitudinal axis.

In another preferred form of the invention, there is provided an apparatus for drilling out a plug of material, said apparatus comprising:

a base plate having a top surface, a bottom surface, and a central longitudinal axis;

a circumferentially-extending side wall extending distally from said top surface of said base plate, said circumferentially-extending side wall comprising an inner surface defining a circular recess enclosed by said circumferentially-extending side wall, an outer surface and a circular distal end surface;

a drill bit centered on said central longitudinal axis of said base plate and extending distally therefrom, said drill bit comprising:

a distal portion;

a proximal portion; and an intermediate portion extending between said distal portion and said proximal portion;

wherein said intermediate portion of said drill bit comprises a first laterally-extending flat comprising a cutting edge disposed a first distance away from said central longitudinal axis towards said circumferentially-extending side wall and a second laterally-extending flat extending a second distance away from said central longitudinal axis towards said circumferentially-extending side wall, and further wherein said first distance is greater than said second distance; and a cutting wedge mounted to said inner surface of said circumferentially-extending side wall and extending laterally inwardly in the direction of said longitudinal axis.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

The present invention provides a new and improved apparatus and method for drilling large-diameter holes in a material which facilitates quick and easy removal of the plug of material remaining in the drilling apparatus after the hole has been drilled out of the material.

For purposes of clarity, the terms "proximal" and "distal" will be used herein with reference to a handheld drill to which the drilling apparatus is typically attached and with reference to the material which is to be drilled out using the drilling apparatus. Accordingly, the term "proximal" will refer to the direction towards the handheld drill to which the drilling apparatus is attached, and the term "distal" will refer to the direction towards the material which is to be drilled by the drilling apparatus (i.e., the direction away from the end of the handheld drill to which the drilling apparatus is attached).

Figure 1:
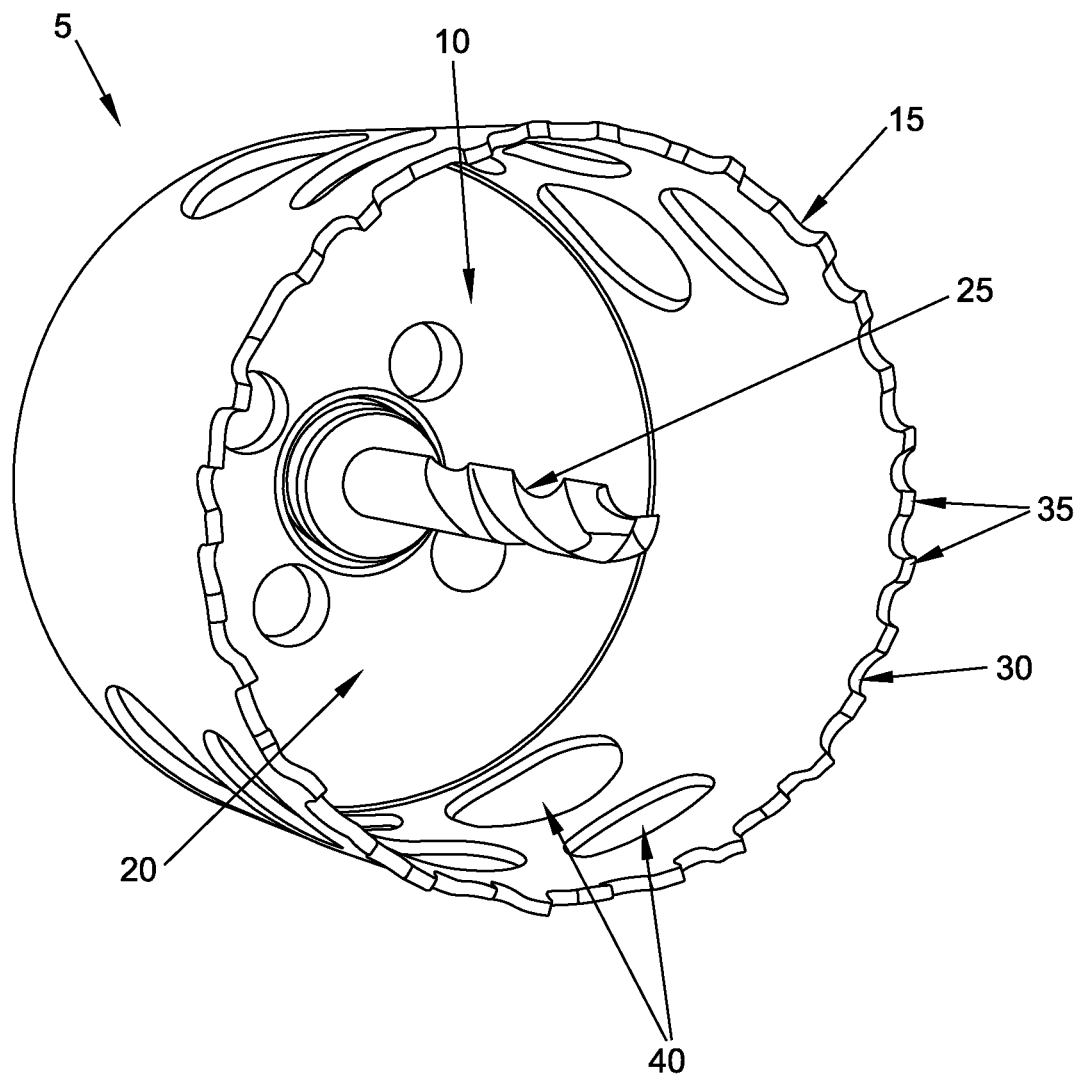
FIGS. 1 and 2 are schematic views of a prior art "barrel-style" drilling apparatus.
Figure 2:
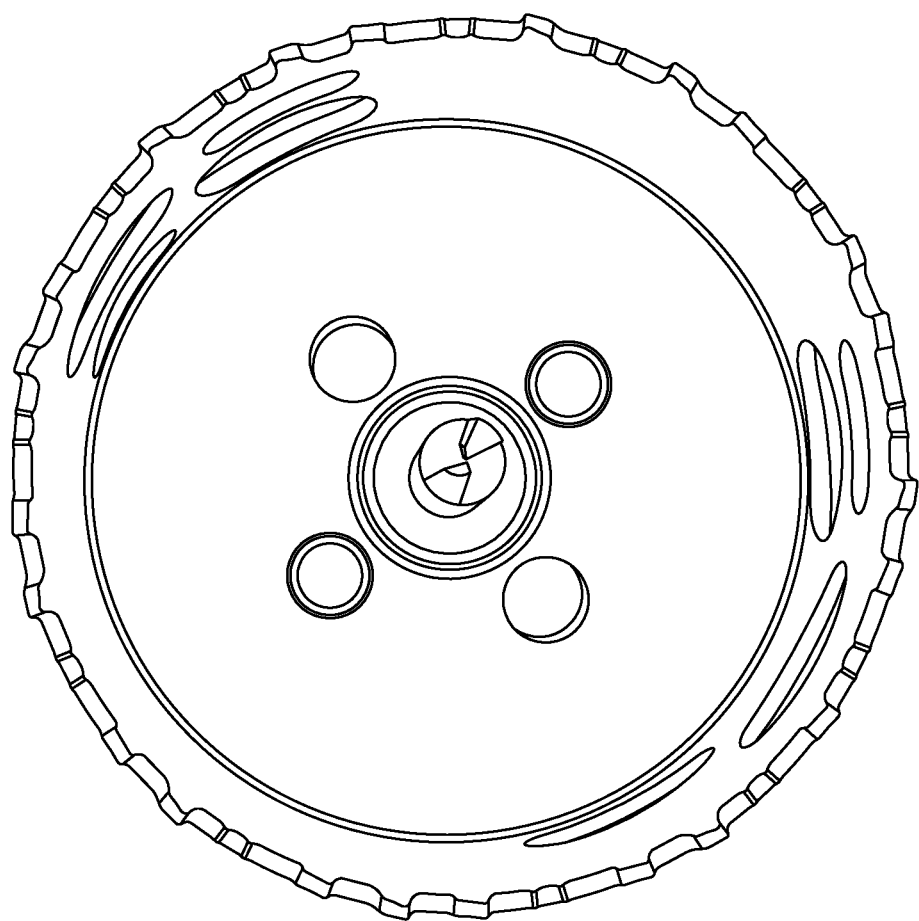
Figure 3:
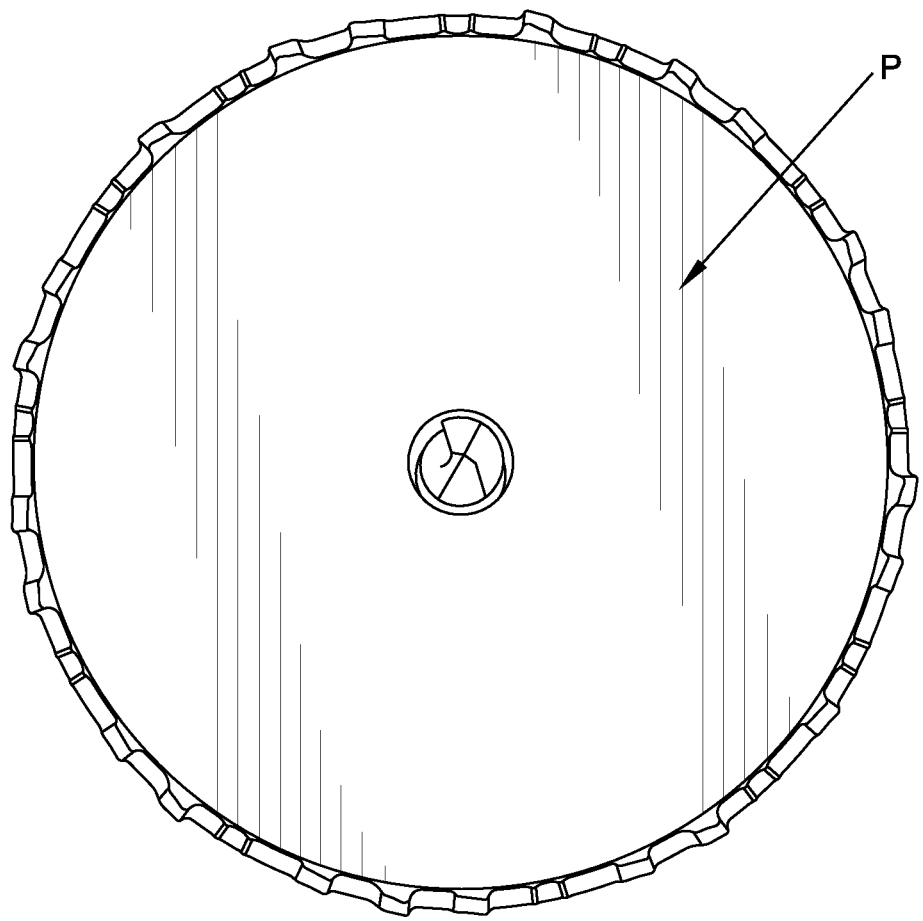
FIG. 3 is a schematic view showing a plug of drilled-out material bound in the recess of a prior art "barrel-style" drilling apparatus.
Figure 4:
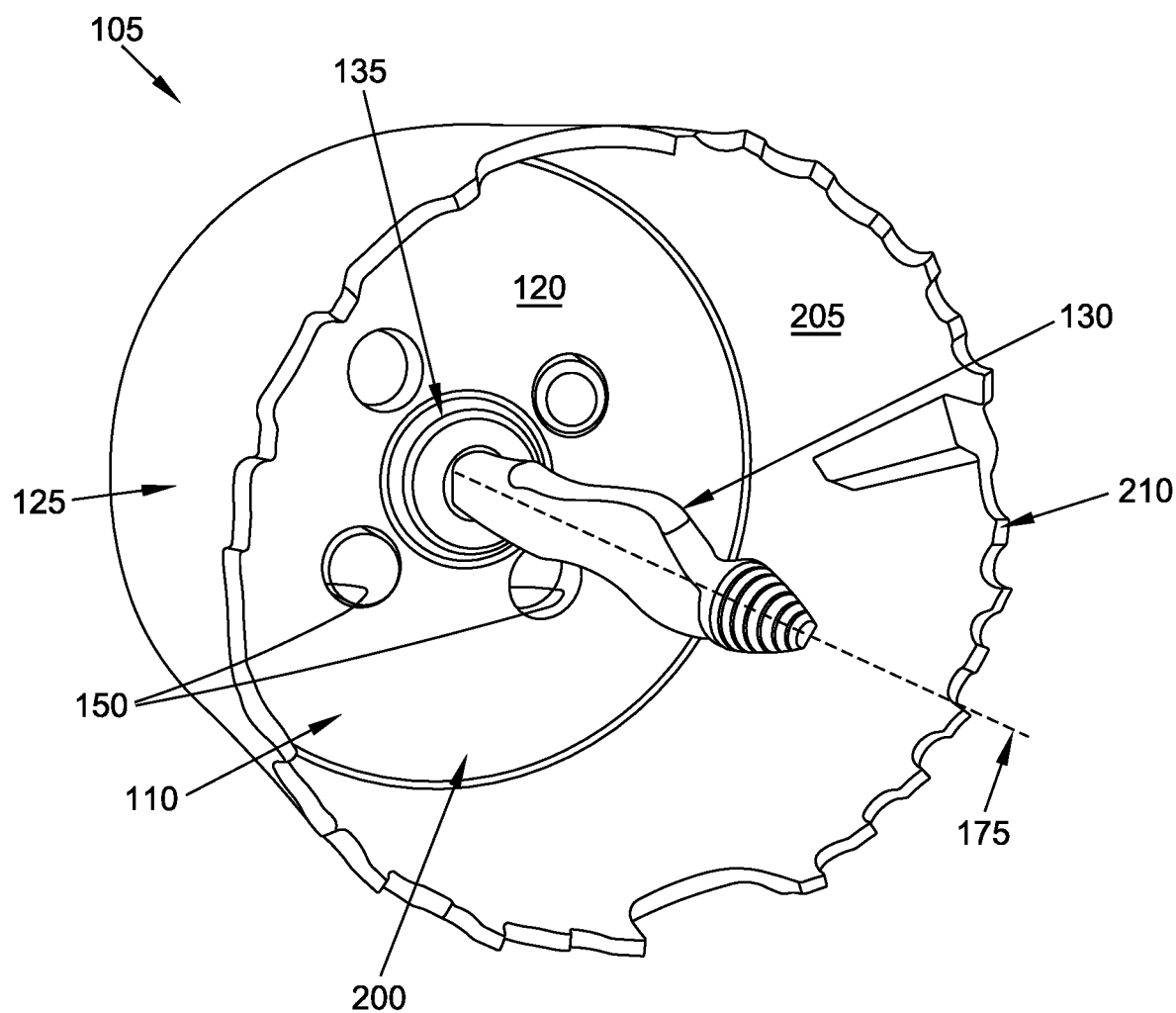
FIG. 4 is a schematic view of a novel "barrel-style" drilling apparatus formed in accordance with the present invention.

Looking now at FIG. 4, there is shown a novel drilling apparatus 105 formed in accordance with the present invention. Drilling apparatus 105 generally comprises a circular base plate 110 having a proximally-facing bottom surface 115 (FIG. 7) and a distally-facing top surface 120, a circumferentially-extending side wall 125 extending distally from top surface 120 of base plate 110, and a centrally-mounted drill bit 130 extending distally relative to top surface 120.

Drill bit 130 is preferably releasably mounted within an opening 135 formed in the center of base plate 110, such that drill bit 130 may be selectively removed and replaced (e.g., to replace due to wear, to change for different-sized drill bits depending on desired use, etc.), and/or rotationally adjusted relative to top surface 120 of base plate 110. Drill bit 130 is preferably mounted to base plate 110 such that rotation of drill bit 130 (e.g., via an electric drill/motor mounted to the proximal end of drill bit 130, not shown) causes simultaneous rotation of base plate 110, and hence rotation of circumferentially-extending side wall 125. In one preferred form of the invention, drill bit 130 is mounted to base plate 110 via a drill bit mount 140 (FIG. 5) comprising one or more mounting tabs 145 sized to be received in counterpart openings 150 formed in base plate 110. In a preferred form of the invention, drill bit mount 140 comprises a pair of diametrically-opposed distally-extending tabs 145, and base plate 110 comprises a plurality of diametrically-opposed openings 150 for receiving tabs 145 when drill bit 130 is mounted to base plate 110, whereby to permit the end user to selectively adjust the rotational disposition of drill bit 130 relative to base plate 110 (and hence relative to circumferentially-extending side wall 125), as will hereinafter be discussed in further detail.

Figure 5:
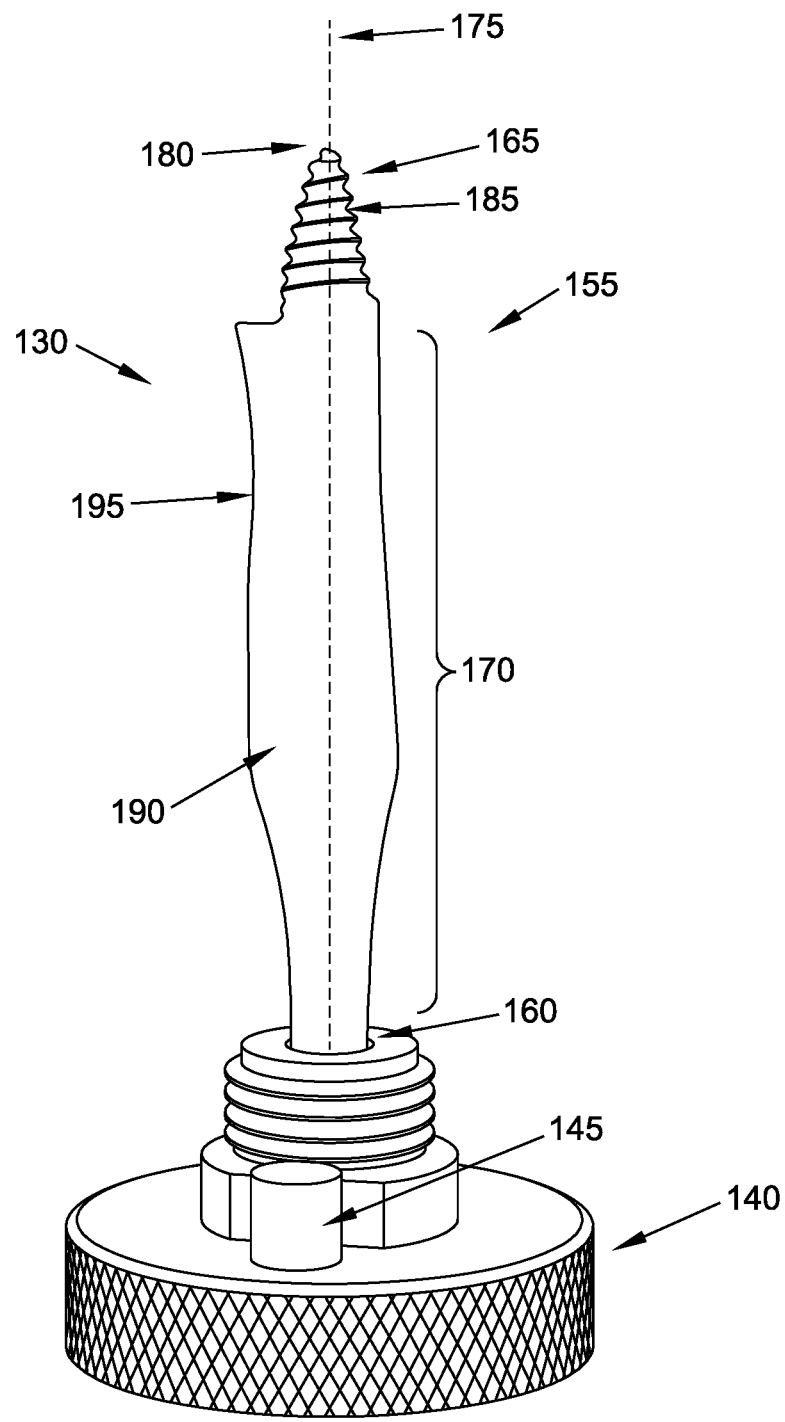
FIGS. 5-10 are schematic views showing further aspects of the novel "barrel-style" drilling apparatus of FIG. 4.

Looking now at FIG. 5, drill bit 130 generally comprises a shaft 155 having a proximal end portion 160 mounted to (or formed integral with) drill bit mount 140, a distal end portion 165, and an intermediate portion 170 extending between proximal end portion 160 and distal end portion 165. Proximal end portion 160 and distal end portion 165 are centered about a longitudinal axis 175 which is, in turn, centered on the center of base plate 110 (i.e., when drill bit 130 is mounted to base plate 110). Distal end portion 165 is preferably tapered to a distal point 180 configured to engage a material that is to be drilled, and distal end portion 165 preferably also comprises a "cork-screw" like recess 185 extending around distal end portion 165, whereby to facilitate debris removal from a "starter hole" formed in the material which is to be drilled as the drill bit 130 is advanced distally, as will hereinafter be discussed in further detail. In a preferred form of the present invention, tapered point 180 of distal end portion 165 of drill bit 130 extends distally beyond the distal-most surface of circumferentially-extending side wall 125, whereby to facilitate drilling of a "starter hole" to stabilize drilling apparatus 105 relative to the material to be drilled-out, as will hereinafter be discussed in further detail.

Still looking at FIG. 5, intermediate portion 170 of drill bit 130 comprises at least one flat 190 which extends laterally relative to longitudinal axis 175 and terminates in a lateral cutting edge 195. It will be appreciated that flat 190 of intermediate portion 170 is disposed laterally asymmetrically relative to longitudinal axis 175, such that lateral cutting edge 195 is laterally offset from longitudinal axis 175 to a greater lateral extent than the edge of flat 190 diametrically-opposed to lateral cutting edge 195. Stated another way, lateral cutting edge 195 extends further laterally away from longitudinal axis 175 than the diametrically-opposed other edge of flat 190, which is disposed laterally closer to longitudinal axis 175. If desired, lateral cutting edge 195 of drill bit 130 may comprise a sharpened edge in order to facilitate cutting into the material which is to be drilled, as will hereinafter be discussed in further detail. In a preferred form of the present invention, flat 190 comprises a curved (e.g., twisted) geometry along it's length, whereby to enhance cutting into the material which is to be drilled. It will also be appreciated that when drill bit 130 is mounted to base plate 110 of drilling apparatus 105, distal end portion 165 and a portion of intermediate portion 170 preferably extend distally beyond the distal end of circumferentially-extending side wall 125 (see FIG. 7), as will hereinafter be discussed in further detail.

Figure 6:
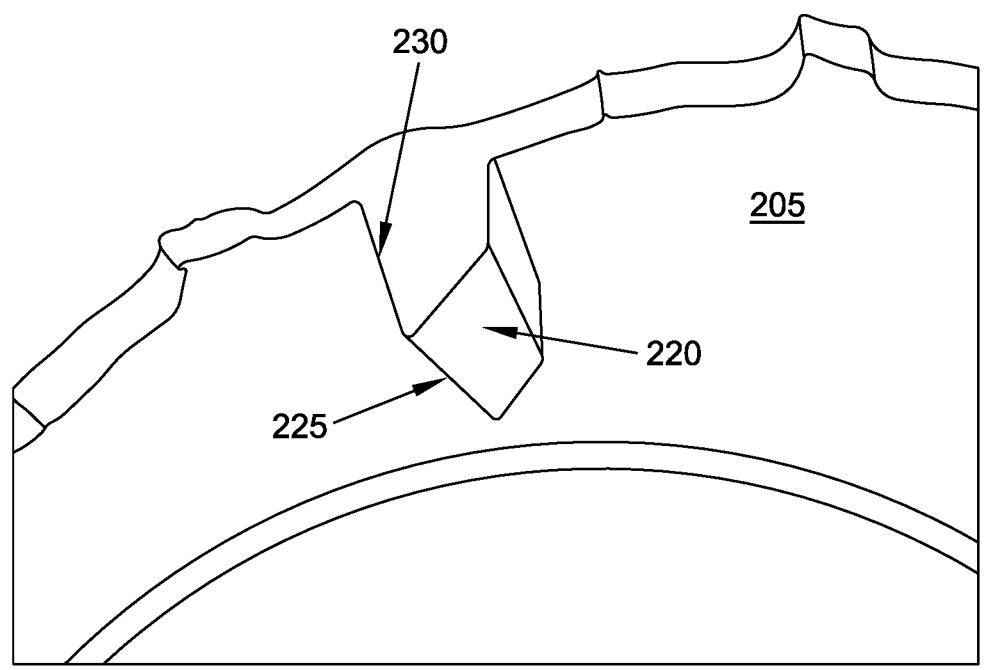
Figure 7:
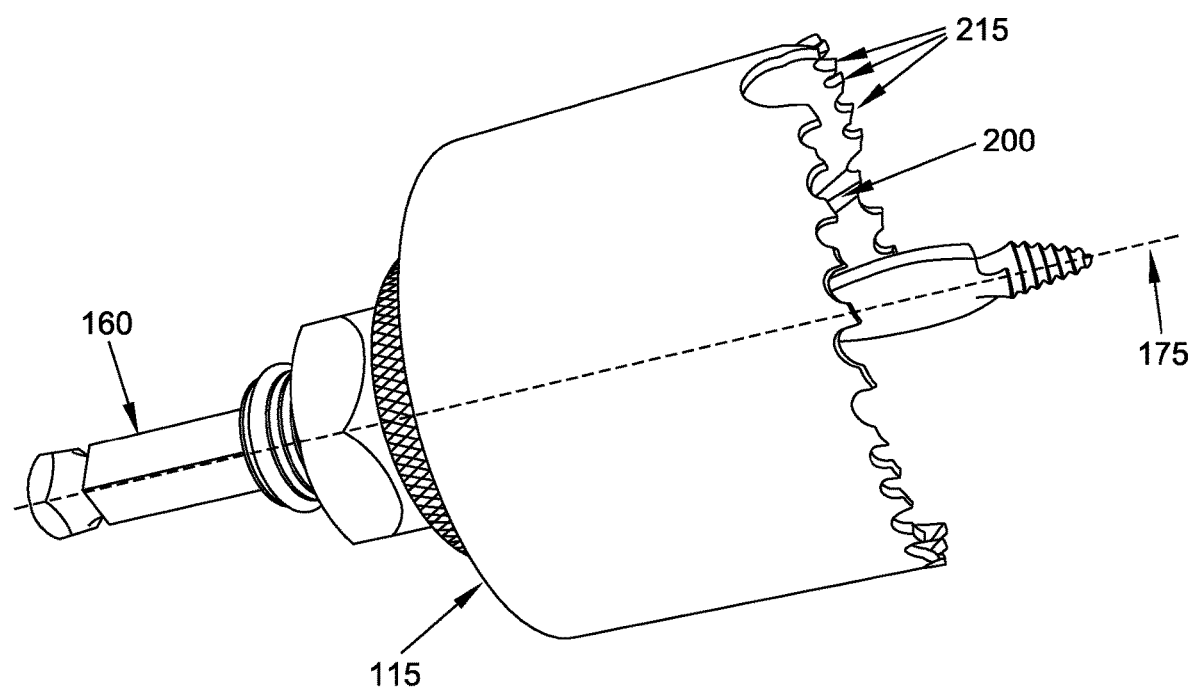

Looking now at FIGS. 4, 6 and 7, circumferentially-extending side wall 125 extends circumferentially about base plate 110 and extends distally from top surface 120 of base plate 110, whereby to define a recess 200 extending about drill bit 130 and centered on longitudinal axis 175, which recess 200 is bounded by an inner surface 205 of circumferentially-extending side wall 125. Circumferentially-extending side wall 125 terminates distally in a circumferentially-extending distal cutting surface 210 having a plurality of cutting teeth 215 formed thereon which are configured to cut into the material which is to be drilled, as will hereinafter be discussed in further detail. Cutting teeth 215 are preferably spaced and angled so as to maximize cutting, in a manner that will be apparent to one of ordinary skill in the art in view of the present disclosure.

Figure 12:
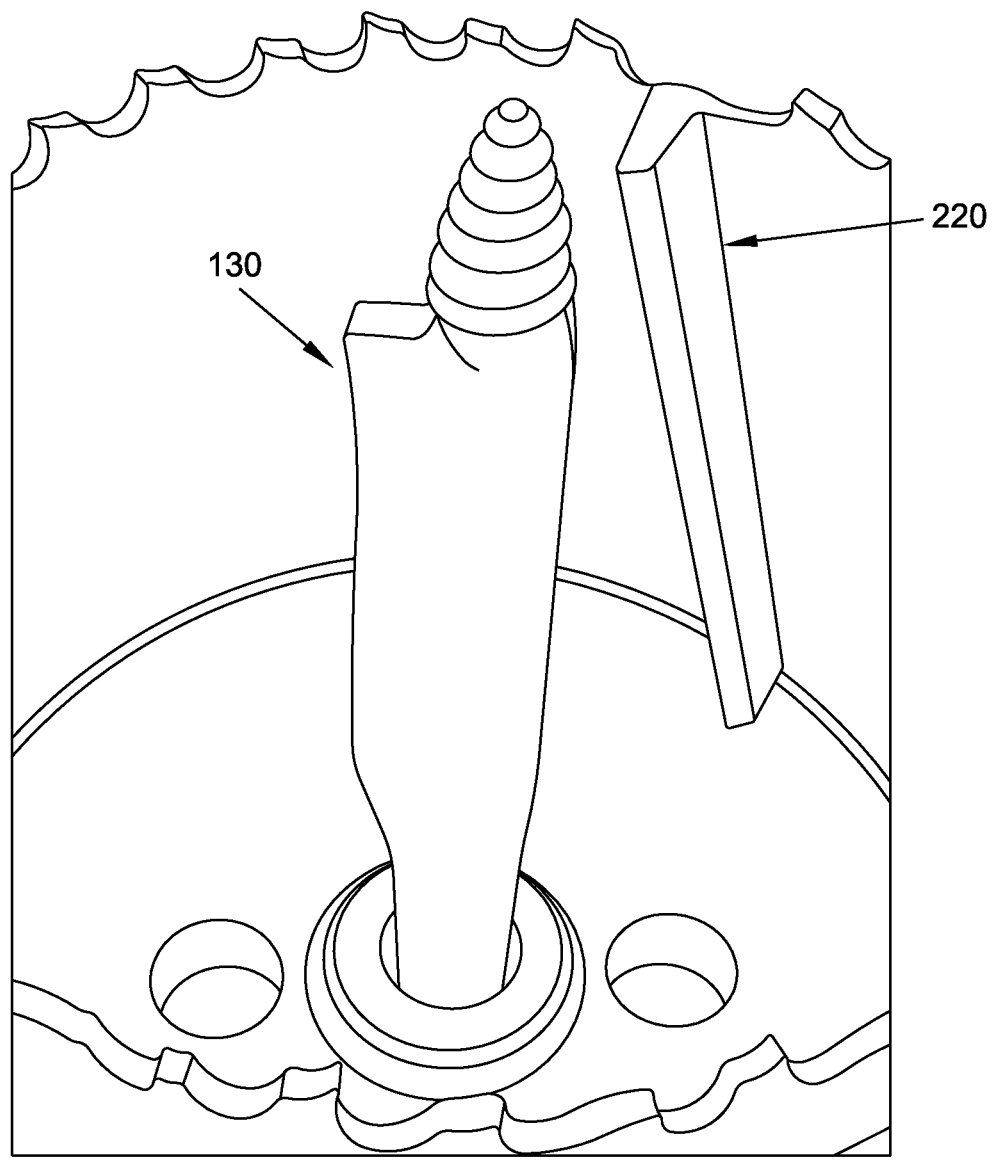
FIG. 12 is a schematic view showing further aspects of the novel "barrel-style" drilling apparatus of the present invention.

A cutting wedge 220 (FIG. 6) is mounted to, or formed integral with, inner surface 205 of circumferentially-extending side wall 125. Cutting wedge 220 preferably comprises a sharpened laterally-extending cutting edge 225 and a sharpened distal cutting edge 230. Cutting wedge 220 (and laterally-extending cutting edge 225) extends along some or all of inner surface 205 of circumferentially-extending side wall 125 proximally from distal cutting surface 210 of circumferentially-extending side wall 125 towards upper surface 120 of base plate 110. It should be appreciated that cutting wedge 220 may extend all of the distance between distal cutting surface 210 of circumferentially-extending side wall 125 and upper surface 120 of base plate 110, or cutting wedge 220 may extend only a portion of the distance between distal cutting surface 210 of circumferentially-extending side wall 125 and upper surface 120 of base plate 110. In one preferred form of the invention, cutting wedge 220 extends approximately one-half of the distance between upper surface 120 of base plate 110 and distal cutting surface 210 (see FIGS. 4, 6 and 8-11). In another form of the invention, cutting wedge 220 extends substantially the entire distance between upper surface 120 of base plate 110 and distal cutting surface 210 (FIG. 12).

Figure 8:
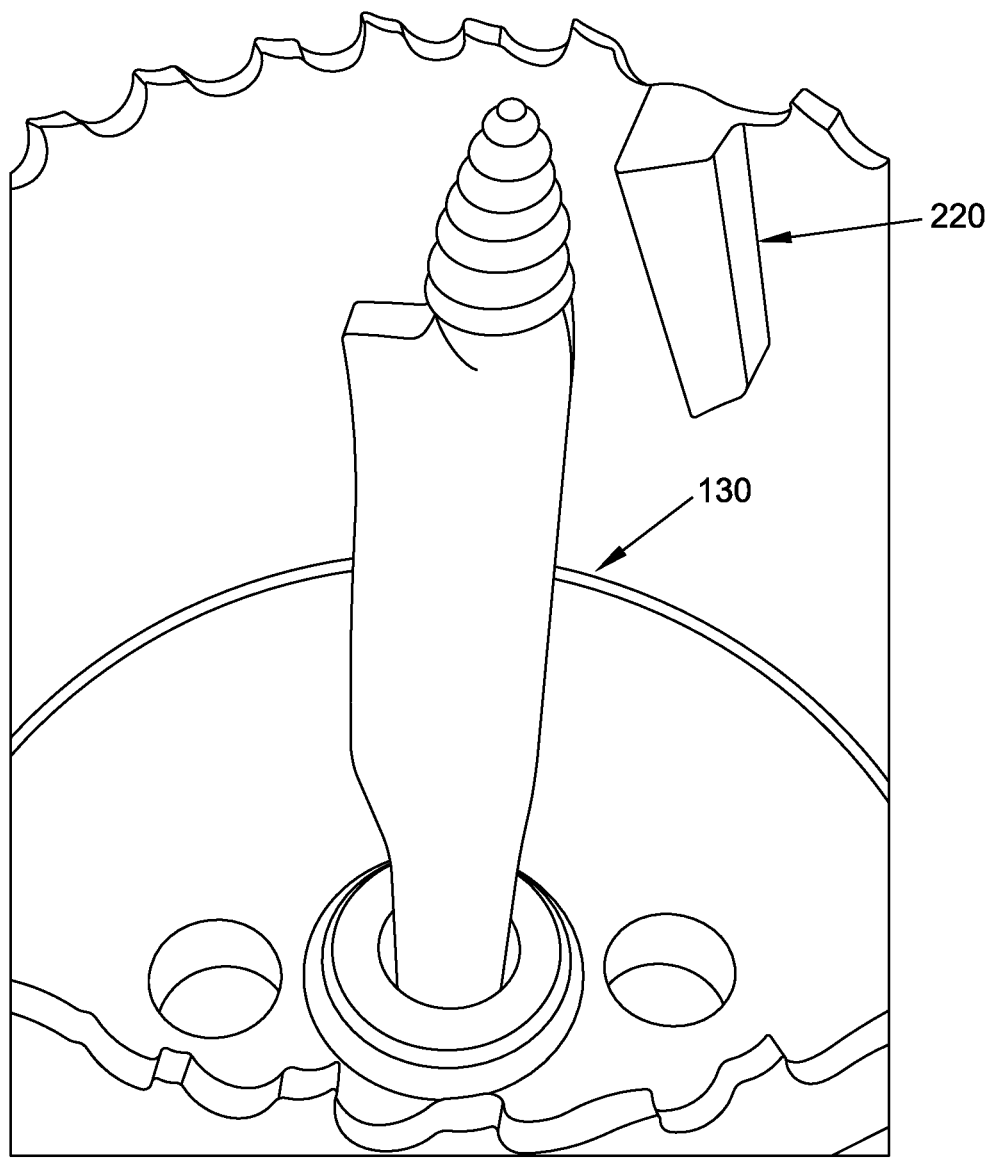

It should also be appreciated that, if desired, cutting wedge 220 may be angled relative to longitudinal axis 175 (e.g., cutting wedge 220 may be disposed at an angle of 5°, 10°, 15°, 20°, 25°, 30°, 35°, 40°, 45°, etc. relative to longitudinal axis 175) such that distal cutting edge 230 of cutting wedge 220 is disposed forward of the proximal end of cutting wedge 220 (e.g., in the manner shown in FIGS. 4 and 8) when circumferentially-extending side wall 125 is rotated (e.g., counter-clockwise from the frame of reference of FIGS. 4 and 8). By way of example but not limitation, distal cutting edge 230 of cutting wedge 220 may be disposed forward of the proximal end of cutting wedge 220 such that when side wall 125 is rotated (e.g., in a counter-clockwise direction in the embodiment shown in FIGS. 4 and 8), sharpened distal cutting edge 230 enters the material which is to be drilled out at an angle, thereby increasing cutting efficiency, as will be apparent to one of ordinary skill in the art in view of the present disclosure.

And it should also be appreciated that laterally-extending cutting edge 225 (and/or distal cutting edge 230) may be angled relative to the plane defined by inner surface 205 of circumferentially-extending side wall 125 so as to enhance cutting. By way of example but not limitation, cutting edge 225 may be disposed substantially perpendicular relative to inner surface 205 of circumferentially-extending side wall 125, cutting edge 225 may be disposed at an acute angle relative to inner surface 205 of circumferentially-extending side wall 125, cutting edge 225 may be disposed at an obtuse angle relative to inner surface 205 of circumferentially-extending side wall 125, etc.

Figure 9:
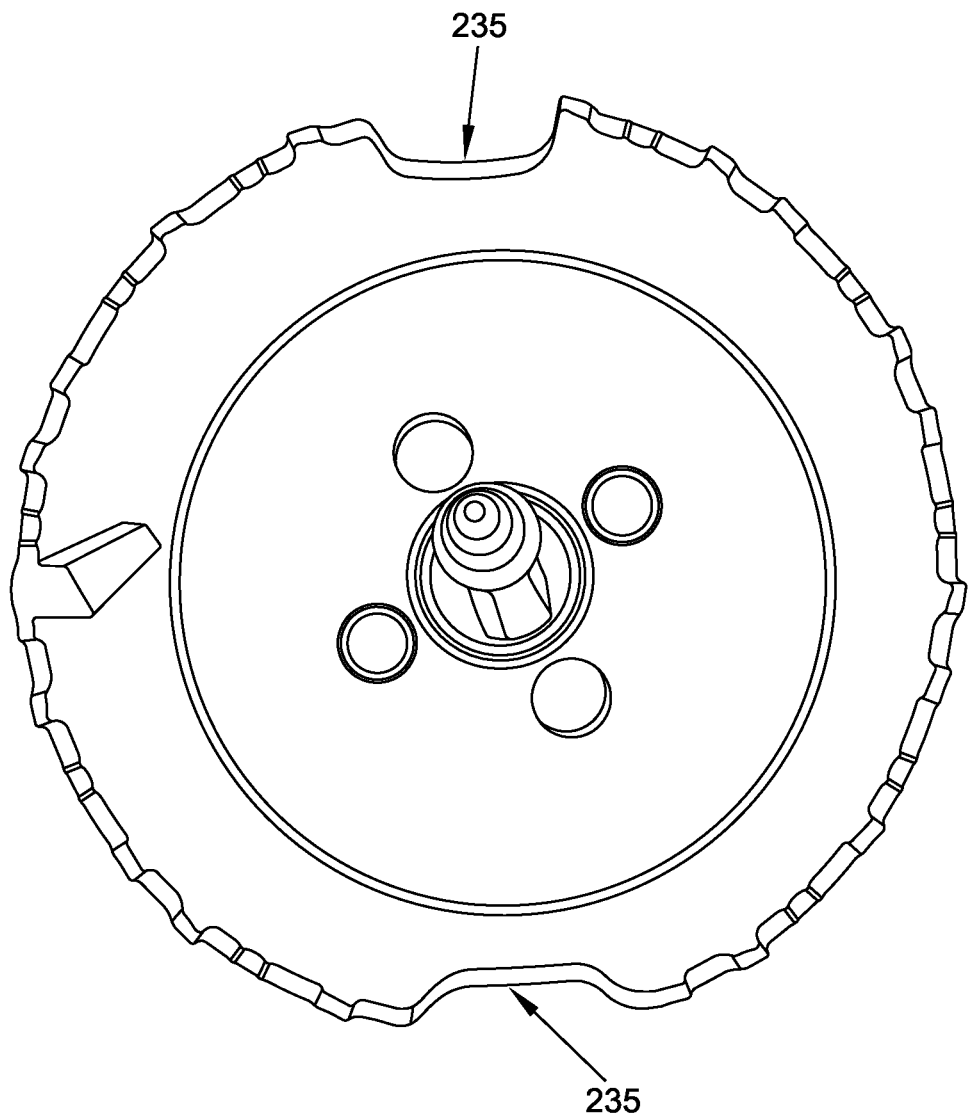
Figure 10:
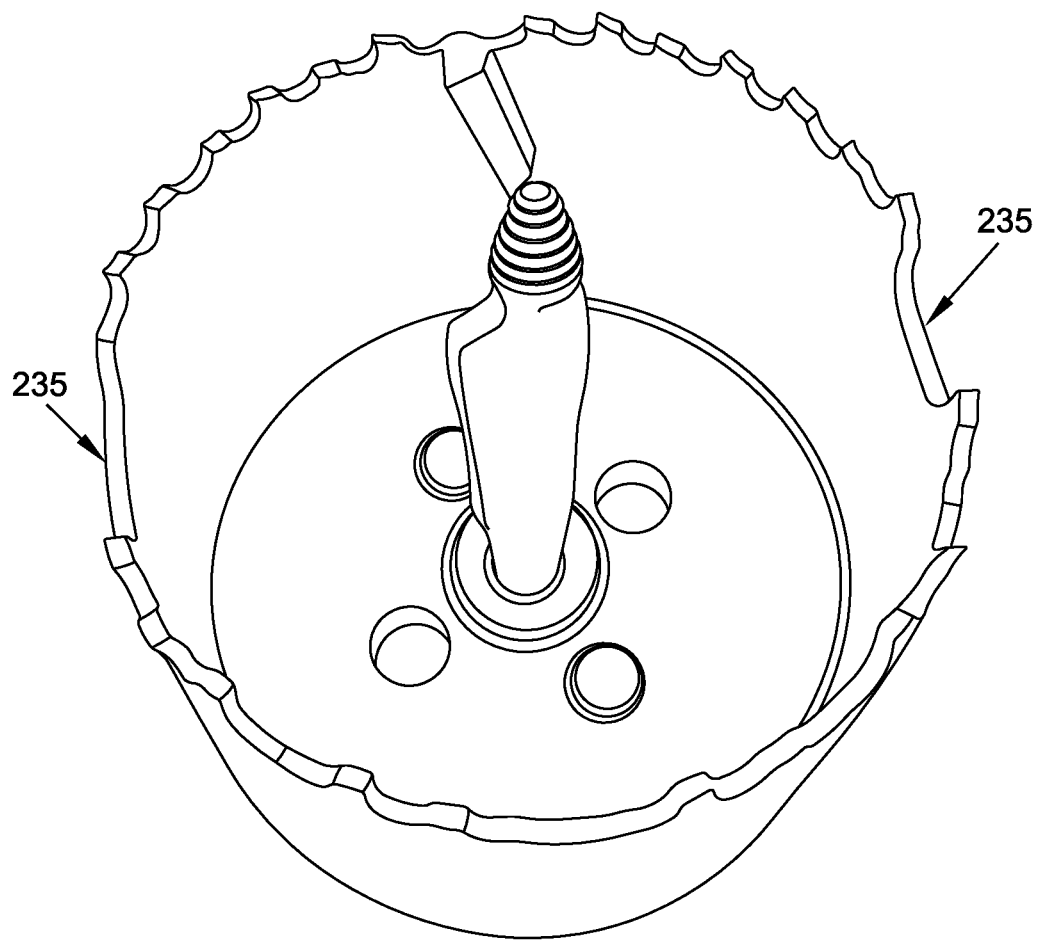
Figure 11:
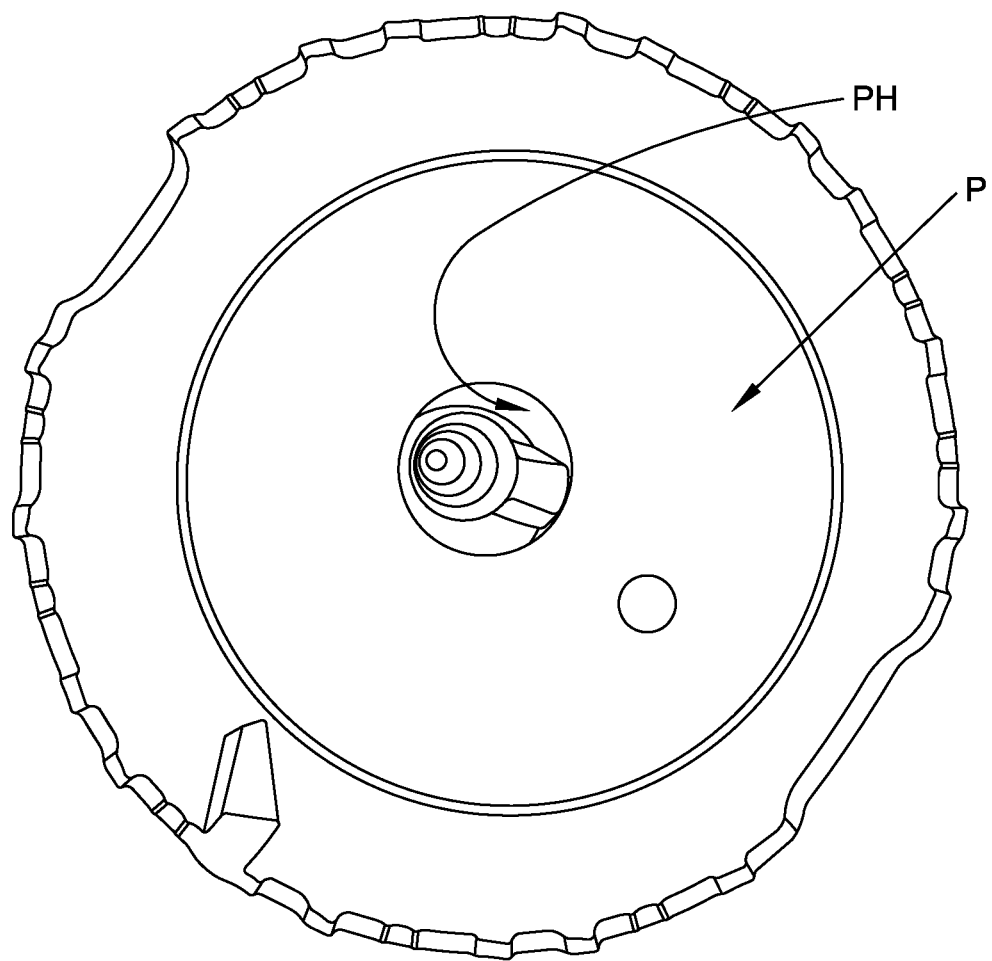
FIG. 11 is a schematic view showing a plug of drilled material in the recess of the "barrel-style" drilling apparatus of FIG. 4 after drilling has been completed.

In one preferred form of the invention, and looking now at FIGS. 8-10, when drill bit 130 is mounted to base plate 110, drill bit 130 is preferably rotationally disposed such that the plane defined by flat 190 is disposed generally perpendicular to the plane defined by sharpened lateral cutting edge 225 of cutting wedge 220.

Additionally and/or alternatively, if desired, a portion of distal cutting surface 210 of circumferentially-extending side wall 125 may be recessed so as to provide fingerholds 235 (see FIG. 9) for grasping a plug P of drilled out material that is disposed in recess 200 after cutting is completed, as will hereinafter be discussed in further detail. Where fingerholds 235 are provided, fingerholds 235 are preferably disposed diametrically-opposed from one another along top surface 210 of circumferentially-extending side wall 125.

Figure 13:
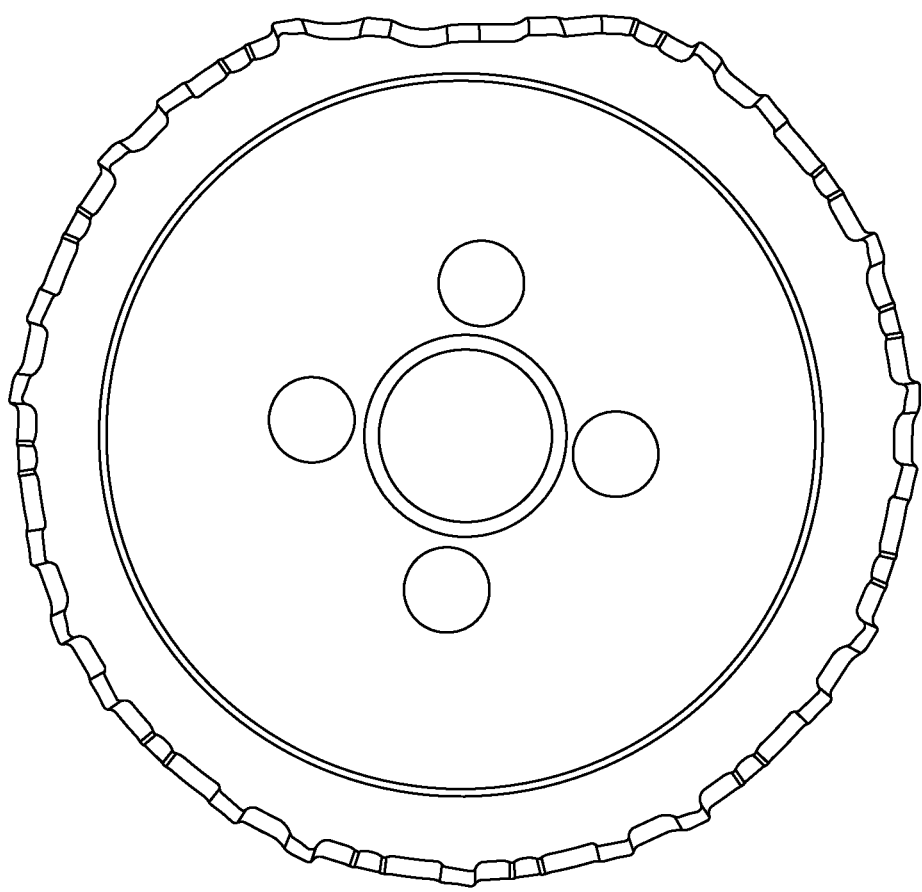
FIG. 13 is a schematic view showing another novel "barrel-style" drilling apparatus formed in accordance with the present invention.

In another embodiment of the present invention, and looking now at FIG. 13, cutting wedge 220 may be omitted. In this form of the invention, a portion of distal cutting surface 210 is deformed laterally inwardly (i.e., towards longitudinal axis 175) such that distal cutting surface 210 comprises a non-circular geometry, whereby to provide a cutting effect similar to the cutting effect of cutting wedge 220.

Use of Drilling Apparatus to Form a Hole in a Material

In use, novel drilling apparatus 105 is mounted to a drill/motor (not shown) by mounting proximal end portion 160 of drill bit 130 (which is, in turn mounted to base plate 110) to the drill/motor.

Distal point 180 of drill bit 130 is aligned with the center point of an imaginary circle inscribed in the material that is to be drilled out, and distal point 180 is advanced distally into the material by rotating drill bit 130 (and hence, drilling apparatus 105) using the drill/motor while applying a distally-directed force to drill bit 130 (i.e., in order to cause distal point 180 to engage and enter into the material that is being drilled, whereby to center drilling apparatus 105 on the material which is to be drilled).

Once distal end portion 165 of drill bit 130 has been advanced into the material that is to be drilled, the end user continues to apply a distally-directed force to drilling apparatus 105 while continuing rotation of drilling apparatus 105 (i.e., using the drill/motor). As intermediate portion 170 of drill bit 130 is advanced distally into the material that is to be drilled out, the drill hole formed by distal portion 165 of drill bit 130 is enlarged (i.e., due to the laterally-extending cutting edge 195 of flat 190 of intermediate portion 170 rotating about longitudinal axis 175).

Once drilling apparatus 105 is advanced distally a sufficient distance such that cutting teeth 215 disposed on top surface 210 of circumferentially-extending side wall 125 engage the material into which a hole is to be drilled out, the rotation of cutting teeth 215 (i.e., rotation about longitudinal axis 175) forms a circumferentially-extending groove in the material into which a hole is to be drilled out. Simultaneously, cutting wedge 220 engages the material into which a hole is to be drilled out, whereby to laterally enlarge the circumferentially-extending groove in the material into which a hole is to be drilled, but only in the inwardly-directed lateral direction (i.e., in the direction towards longitudinal axis 175, away from inner surface 205 of circumferentially-extending side wall 125). As a result, the maximum diameter of the hole drilled in the material is the same diameter as the diameter of the circle inscribed by circumferentially-extending side wall 125. However, the diameter of the plug P of material that is drilled out of the hole is smaller than the diameter of the circle inscribed by the plane of inner surface 205 of circumferentially-extending side wall 125 (i.e., smaller by the laterally-extending width of cutting wedge 220), resulting in a plug P having a diameter somewhat smaller than the maximum diameter of the hole which is drilled out of the material.

Similarly, because laterally-extending flat 190 of intermediate portion 170 of drill bit 130 extends laterally outboard of longitudinal axis 175 of drill bit 130, as laterally-extending flat 190 is rotated about longitudinal axis 175, a central drill hole PH is formed in plug P which has a diameter slightly larger than the maximum lateral dimension of drill bit 130 (i.e., larger than the maximum width of laterally-extending flat 190).

Once drilling has been completed (e.g., after drilling apparatus 105 has been advanced all the way through the material in which a hole is to be formed), a plug P of material which is drilled out is disposed in recess 200 of drilling apparatus 105 which plug P: (i) has an overall diameter slightly less than the diameter of the circle inscribed by the plane of inner surface 205 of circumferentially-extending side wall 125, and (ii) has a central drill PH hole having a diameter which is slightly larger than the maximum lateral dimension of drill bit 130.

As a result of the foregoing, plug P does not bind to either circumferentially-extending side wall 125 or drill bit 130 of drilling apparatus 105, and plug P can be easily and quickly removed from recess 200 (e.g., by grasping plug P with fingers disposed in fingerholds 235, by tipping drilling apparatus 105 over and allowing plug P to fall out due to gravity, etc.) without requiring significant effort by the end user.

Significantly, in addition to the foregoing, it has also been found that drilling apparatus 105 facilitates much faster drilling into a material than prior art "barrel-style" drill bits. Specifically, as cutting wedge 220 is rotated and begins to cut into the material that is to be drilled out, the removal of material by cutting wedge 220 allows cutting teeth 215 to more efficiently cut into the material that is being drilled (e.g., by directing debris away from the area where cutting into the material is being performed, so that the debris moves towards base plate 110). Thus, the present invention not only provides the substantial benefit of facilitating quick and easy removal of a plug P from recess 200, the present invention also provides the unexpected benefit of increasing the speed and efficiency of drilling a hole in a material.

MODIFICATIONS

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. An apparatus for drilling out a plug of material, said apparatus comprising:

a base plate having a top surface, a bottom surface, and a central longitudinal axis;

a circumferentially-extending side wall extending distally from said top surface of said base plate, said circumferentially-extending side wall terminating in a circular distal end surface;

a drill bit centered on said central longitudinal axis of said base plate and extending distally therefrom, said drill bit comprising a distal portion, a proximal portion and an intermediate portion extending between said distal portion and said proximal portion;

wherein said intermediate portion of said drill bit comprises a first laterally-extending flat comprising a cutting edge disposed a first distance away from said central longitudinal axis towards said circumferentially-extending side wall and a second laterally-extending flat extending a second distance away from said central longitudinal axis towards said circumferentially-extending side wall, and further wherein said first distance is greater than said second distance.

2. The apparatus of claim 1 wherein said cutting edge of said first laterally-extending flat is sharpened to facilitate cutting into a material.

3. The apparatus according to claim 1 wherein said drill bit is releasably mounted to said base plate, and further wherein rotation of said drill bit effects simultaneous rotation of said base plate.

4. The apparatus according to claim 3 wherein said drill bit further comprises a drill bit mounting plate mounted to said proximal portion of said drill bit, and further wherein said drill bit mounting plate comprises a plurality of tabs configured to be received in a plurality of openings formed in said base plate.

5. The apparatus according to claim 1 wherein said distal portion of said drill bit comprises a tapered point centered on said longitudinal axis, and further wherein said tapered point comprises a spiral recess extending from a distal end of said distal portion of said drill bit to a proximal end of said distal portion of said drill bit.

6. The apparatus according to claim 1 wherein at least one of said first laterally-extending flat and said second laterally-extending flat comprises a non-planar geometry along the length of said intermediate portion of said drill bit.

7. The apparatus according to claim 6 wherein said first laterally-extending flat and said second laterally-extending flat are disposed in a first plane having a geometry along the length of said first plane which is curved relative to a second plane extending normal to said central longitudinal axis.

8. The apparatus according to claim 1 wherein a distal end of said distal portion of said drill bit extends distally beyond a plane extending parallel to said top surface of said circumferentially-extending side wall.

9. The apparatus according to claim 1 wherein said circumferentially-extending side wall comprises an inner surface and an outer surface, and further wherein a cutting wedge is mounted to said inner surface of said circumferentially-extending side wall and extends laterally inwardly in the direction of said longitudinal axis.

10. An apparatus for drilling out a plug of material, said apparatus comprising:

a base plate having a top surface, a bottom surface, and a central longitudinal axis;

a circumferentially-extending side wall extending distally from said top surface of said base plate, whereby to form an inner surface defining a circular recess enclosed by said circumferentially-extending side wall, said inner surface being defined by a side wall plane extending normal to said base plate, an outer surface and a circular distal end surface; and a single cutting wedge mounted to said inner surface of said circumferentially-extending side wall and extending laterally inwardly of said side wall plane in the direction of said longitudinal axis.

11. The apparatus according to claim 10 wherein said cutting wedge comprises a sharpened lateral edge along the portion of said cutting wedge extending away from said inner surface of said circumferentially-extending side wall.

12. The apparatus according to claim 10 wherein said cutting wedge comprises a sharpened distal end.

13. The apparatus according to claim 10 wherein said cutting wedge extends half of the distance between (i) a plane disposed parallel to said circular distal end surface of said circumferentially-extending side wall, and (ii) the top surface of said baseplate.

14. The apparatus according to claim 10 wherein said cutting wedge is mounted to said inner surface of said circumferentially-extending side wall at an angle relative to said longitudinal axis.

15. The apparatus according to claim 14 wherein said drill bit comprises a distal portion, a proximal portion and an intermediate portion extending between said distal portion and said proximal portion; and wherein said intermediate portion of said drill bit comprises a first laterally-extending flat comprising a cutting edge disposed a first distance away from said central longitudinal axis towards said circumferentially-extending side wall and a second longitudinally-extending flat extending a second distance away from said central longitudinal axis towards said circumferentially-extending side wall, and further wherein said first distance greater than said second distance.

16. The apparatus of claim 15 wherein said cutting edge of said first laterally-extending flat is sharpened to facilitate cutting into a material.

17. The apparatus according to claim 15 wherein at least one of said first laterally-extending flat and said second laterally-extending flat comprises a non-planar geometry along the length of said intermediate portion of said drill bit.

18. The apparatus according to claim 17 wherein a distal end of said distal portion of said drill bit extends distally beyond a plane extending parallel to said top surface of said circumferentially-extending side wall.

19. The apparatus according to claim 10 further comprising a drill bit extending distally from the top surface of said baseplate, and further wherein said drill bit is centered on said longitudinal axis.

20. An apparatus for drilling out a plug of material, said apparatus comprising:

a base plate having a top surface, a bottom surface, and a central longitudinal axis;

a circumferentially-extending side wall extending distally from said top surface of said base plate, said circumferentially-extending side wall comprising an inner surface defining a circular recess enclosed by said circumferentially-extending side wall, an outer surface and a circular distal end surface;

a drill bit centered on said central longitudinal axis of said base plate and extending distally therefrom, said drill bit comprising:

a distal portion;

a proximal portion; and an intermediate portion extending between said distal portion and said proximal portion;

wherein said intermediate portion of said drill bit comprises a first laterally-extending flat comprising a cutting edge disposed a first distance away from said central longitudinal axis towards said circumferentially-extending side wall and a second laterally-extending flat extending a second distance away from said central longitudinal axis towards said circumferentially-extending side wall, and further wherein said first distance is greater than said second distance; and a cutting wedge mounted to said inner surface of said circumferentially-extending side wall and extending laterally inwardly in the direction of said longitudinal axis.

\* \* \* \* \*